(12) United States Patent
Wang

(10) Patent No.: US 10,640,272 B2
(45) Date of Patent: May 5, 2020

(54) PACKAGING BAG, APPARATUS AND METHOD FOR MANUFACTURING FILM MATERIAL OF THE PACKAGING BAG, AND METHOD OF MANUFACTURING THE PACKAGING BAG

(71) Applicant: Shanghai Zhou Tai Light Industry Machinery Manufacturing Co., Ltd, Shanghai (CN)

(72) Inventor: Jian Wang, Shanghai (CN)

(73) Assignee: SHANGHAI ZHOUTAI LIGHT INDUSTRY MACHINERY MANUFACTURING., LTD, Shanghai (CN)

( * ) Notice: Subject to any disclaimer, the term of this patent is extended or adjusted under 35 U.S.C. 154(b) by 0 days.

(21) Appl. No.: 15/803,847

(22) Filed: Nov. 6, 2017

(65) Prior Publication Data
US 2018/0362235 A1 Dec. 20, 2018

(30) Foreign Application Priority Data
Jun. 20, 2017 (CN) .......................... 2017 1 0471279

(51) Int. Cl.
*B65D 75/00* (2006.01)
*B31B 70/00* (2017.01)
(Continued)

(52) U.S. Cl.
CPC ............ *B65D 75/56* (2013.01); *B31B 70/002* (2017.08); *B31B 70/008* (2017.08); *B31B 70/142* (2017.08); *B31B 70/64* (2017.08); *B31B 70/868* (2017.08); *B65D 33/14* (2013.01); *B29C 2793/0045* (2013.01); *B31B 50/81* (2017.08); *B31B 50/8122* (2017.08); *B31B 50/84* (2017.08); *B31B 2150/20* (2017.08);
(Continued)

(58) Field of Classification Search
CPC ....... B65D 75/56; B31B 70/002; B31B 70/64; B31B 2160/30; B31B 50/81; B31B 50/84; B29C 2793/0045; Y10T 156/1304
See application file for complete search history.

(56) References Cited

U.S. PATENT DOCUMENTS 1,275,788 A * 8/1918 Swift ...................... B31B 70/00
493/220
1,958,005 A * 5/1934 Klinger .................. B31B 70/00
493/334
(Continued)

*Primary Examiner* — Linda L Gray
(74) *Attorney, Agent, or Firm* — Bayramoglu Law Offices LLC

(57) ABSTRACT

The invention discloses a packaging bag and an apparatus and a method for manufacturing film material of the packaging bag, and a method of manufacturing the packaging bag. The processing of the portable portion is conducted by the apparatus for manufacturing film material, and the prepared film material is made into a packaging bag finally. In the technical solution of the invention, by adding a handle structure on the side portion of the big-sized packaging bag, the bag structure of the invention is easy to carry or move the packaging bag and the product within the packaging bag that is large in weight, structure, and size. The packaging bag of the present invention has a simple structure, which is convenient to use and process, improving the practicality and usability of the bag.

5 Claims, 5 Drawing Sheets

(51) Int. Cl.
*B65D 33/00* (2006.01)
*B31B 50/00* (2017.01)
*B32B 38/00* (2006.01)
*B65D 75/56* (2006.01)
*B31B 70/64* (2017.01)
*B31B 70/14* (2017.01)
*B65D 33/14* (2006.01)
*B31B 70/86* (2017.01)
*B31B 160/30* (2017.01)
*B31B 150/20* (2017.01)
*B31B 50/81* (2017.01)
*B31B 50/84* (2017.01)
*B32B 38/04* (2006.01)

(52) U.S. Cl.
CPC ..... *B31B 2160/30* (2017.08); *B32B 2038/042* (2013.01); *B32B 2038/047* (2013.01); *Y10T 156/1304* (2015.01); *Y10T 156/1309* (2015.01)

(56) References Cited

U.S. PATENT DOCUMENTS

| | | | | |
|---|---|---|---|---|
| 1,983,323 A | * | 12/1934 | Stokes | B31B 50/00 493/55 |
| 2,284,872 A | * | 6/1942 | Jaeger | B32B 37/0076 83/100 |
| 3,287,878 A | * | 11/1966 | Mobley | B29C 66/72343 53/133.1 |
| 3,471,351 A | * | 10/1969 | Fuchs | B31B 50/00 156/252 |

\* cited by examiner

PACKAGING BAG, APPARATUS AND METHOD FOR MANUFACTURING FILM MATERIAL OF THE PACKAGING BAG, AND METHOD OF MANUFACTURING THE PACKAGING BAG

CROSS REFERENCE TO RELATED APPLICATIONS

This application is based upon and claims priority to Chinese Patent Application No. CN 201710471279.5, filed on Jun. 20, 2017, the entire content of which is incorporated herein by reference.

TECHNICAL FIELD

The present invention relates to the technical field of packaging bags, and more particularly to a packaging bag and an apparatus and a method for manufacturing film material of the packing bag, and a method of manufacturing the packaging bag.

BACKGROUND

In the current packaging bag market, there are a variety of packaging bags, which not only bring convenience to the users, but also promote the development of packaging industry and bag manufacturing industry. In our daily life and production, more and more bag packed rice, pet food, and so on are found in the market. These kinds of bags feature longer size and heavier goods, and usually need to be held in arms or folded for carrying or taking, thereby bringing inconvenience to the users.

SUMMARY OF THE INVENTION

The technical problem solved by the present invention is that the conventional large-sized packaging bag is inconvenient to carry or move.

To solve the above-mentioned technical problems, the technical solution of the present invention provides a packaging bag, wherein the side portion of the packaging bag is provided with a portable portion.

Alternatively, the portable portion includes a sealing patch and a portable patch, the sealing patch covers the portable patch.

In order to solve the above technical problems, the technical solution of the present invention further provides an apparatus for manufacturing a film material, the film material is used for making a packaging bag having a portable portion. The apparatus includes:

a traction device configured for transporting the film material;

a punching device configured for punching the film material;

a clamping device configured for clamping a patch, wherein the patch is used for attaching to the film material;

a point ironing device configured for point-ironing the patch;

an ironing and pressing device configured for ironing and pressing the patch; and a cooling device configured for cooling the patch.

Alternatively, two traction devices are used, the two traction devices are provided at both ends of an operating table; the punching device, the clamping device, the point-ironing device, the ironing and pressing device and the cooling device are mounted on the operation table and located between the two traction devices.

Alternatively, the clamping device is provided with clamping jaws for gripping the patch.

Alternatively, the traction device comprises two rollers having opposite rotation directions, the film material is located between the two rollers.

In order to solve the above-mentioned technical problems, the technical solution of the present invention provides a method of manufacturing a film material, including the steps of:

punching the film material to form a punching hole;

clamping a sealing patch and moving the sealing patch over the film material;

point-ironing the sealing patch to combine the sealing patch with the film material, the sealing patch covers the punching hole completely with margin extending beyond the punching hole;

ironing and pressing the sealing patch to combine the sealing patch with the film material, ironing and pressing all around the margin of the sealing patch to ensure sealing property;

cooling the sealing patch to cool the sealing patch and the film material into one piece.

Alternatively, the method further comprises, before punching hole to the film material:

clamping a portable patch and moving the portable patch over the film material;

point-ironing the portable patch to combine the portable patch with the film material, the punching hole is located outside the portable patch, the size of the portable patch is smaller than the size of the sealing patch;

ironing and pressing the portable patch to combine the portable patch with the film material;

cooling the portable patch to cool the portable patch and the film material into one piece.

Alternatively, the portable patch is provided with a plurality of layers.

In order to solve the above-mentioned technical problems, the technical solution of the present invention provides a method for manufacturing a packaging bag with the film material made by using the method as described above. A patch is located on the side portion of the packaging bag.

The advantages of the technical solution of the present invention are described as below.

By adding a portable portion on the side portion of the big-sized packaging bag, the bag structure of the present invention makes it easy to carry or move the packaging bag and the product within the packaging bag that is large in weight, structure, and size. The packaging bag of the present invention has a simple structure, which is convenient to use and process, thereby improving the practicality and usability of the bag.

Figure 1:
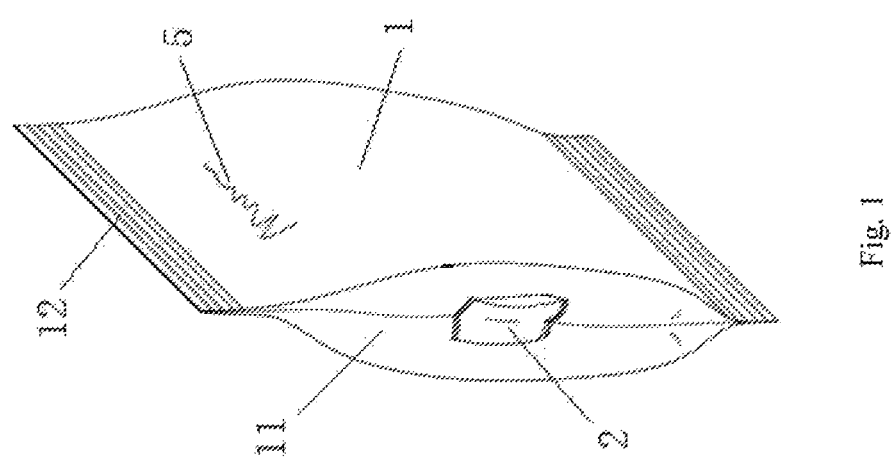
FIG. 1 is a schematic perspective view of a packaging bag according to an embodiment of the present invention.

In the drawings, 1. packaging bag, 2. portable portion, 3. device, 4. film material, 5. LOGO, 11. side portion, 12. pocket, 31. operation table, 32. traction device, 33. first clamping device, 34. first point ironing device, 35. first ironing and pressing device, 36. first cooling device, 37. punching device, 331. second clamping device, 341. second point ironing device, 351. second ironing and pressing device, 361. second cooling device, 100. clamping jaws, 200. portable patch, 300. sealing patch, 400. long capsule-shaped hole.

DETAILED DESCRIPTION OF THE INVENTION

The present invention will be described in further detail with reference to the accompanying drawings and embodiments, but is not intended to be limiting of the invention.

In the present embodiment, an accordion packing bag is taken as an example. Referring to FIG. 1, which shows a perspective view of an accordion packing bag. Side portion 11 of the accordion packing bag is provided with portable portion 2. Specifically, in FIG. 1, the side of the accordion packing bag having information of LOGO 5 is the front side of the accordion packing bag. The upper portion of the accordion packing bag 1 is pocket 12, all the sides connected to (or adjacent to) pocket 12 can be called the side portion of the packing bag. One side portion of accordion packing bag 1 is provided with portable portion 2, also called handle structure. In other embodiments, the portable portion can be provided in the other side portion or both side portions, even on the side opposite to the side having the information of LOGO 5 (i.e., the back side of the packing bag). All of these methods can achieve the effect of carrying by gripping the portable portion. The user can carry or move things by gripping portable portion 2. The portable portion is provided in the side portion rather than the pocket of the packing bag to prevent any damage to the pocket while gripping the packing bag. Further, when the size of the packaging bag is large, a suitable size of the portable portion can be provided at a proper position in the side portion to overcome the gravity of the packaging bag in gripping the packing bag so that the goods in the packing bag can be lifted effortlessly.

Further, portable portion 2 includes sealing patch 300 and portable patch 200, and sealing patch 300 covers portable patch 200.

Figure 2:
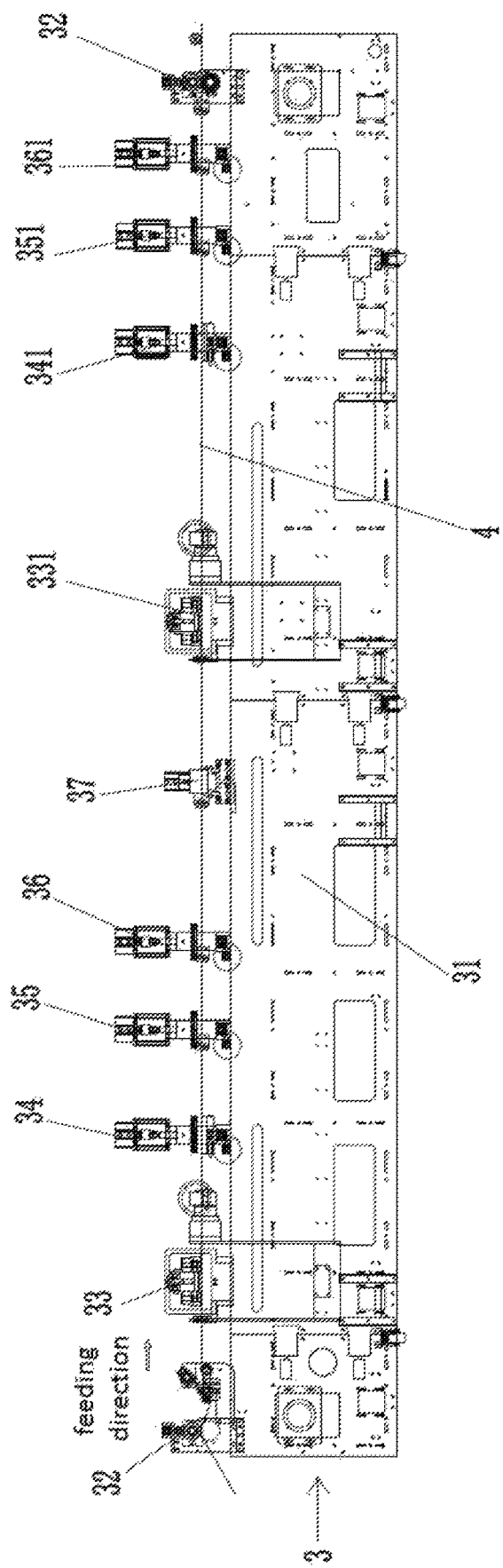
FIG. 2 is a schematic structural view of an apparatus for manufacturing a film material of the packaging bag according to an embodiment of the present invention.

Referring to FIG. 2, in device 3 for manufacturing a film material of an embodiment of the present invention, film material 4 is used for making a packaging bag. Device 3 includes operation table 31, traction device 32 for transporting the film material, punching device 37 for punching holes, clamping devices 33, 331 (a sealing patch or a portable patch for attaching to the film material) for clamping a sealing patch and/or a portable patch, point ironing devices 34, 341 for point ironing the sealing patch or the portable patch, ironing and pressing devices 35, 351 for ironing and pressing the sealing patch or the portable patch, and cooling devices 36, 361 for cooling the sealing patch or the portable patch.

In the present embodiment, there are two traction devices 32, and traction devices 32 are provided at both ends of operation table 31. The punching device, the clamping device, the point ironing device, the ironing and pressing device, and the cooling device are sequentially mounted on operation table 31 between two traction devices 32. It should be noted that the punching device, the clamping device, the point ironing device, the ironing and pressing device, and the cooling device in the present embodiment are existing technical devices. The ordinary skilled person in the art can easily understand the relative action effect of the devices involved in the embodiments, and the detailed description will be omitted here. For example, the clamping device can be a biaxial or triaxial moving structure device, the punching device is a punching device with up and down moving structure. It should be understood that any simple, easy-to-understand, or obvious structural improvements to any of devices involved in the present embodiment to achieve the technical solution and realize the same or equivalent technical effect as that in the present embodiment all fall into the scope of the present embodiment.

Figure 3:
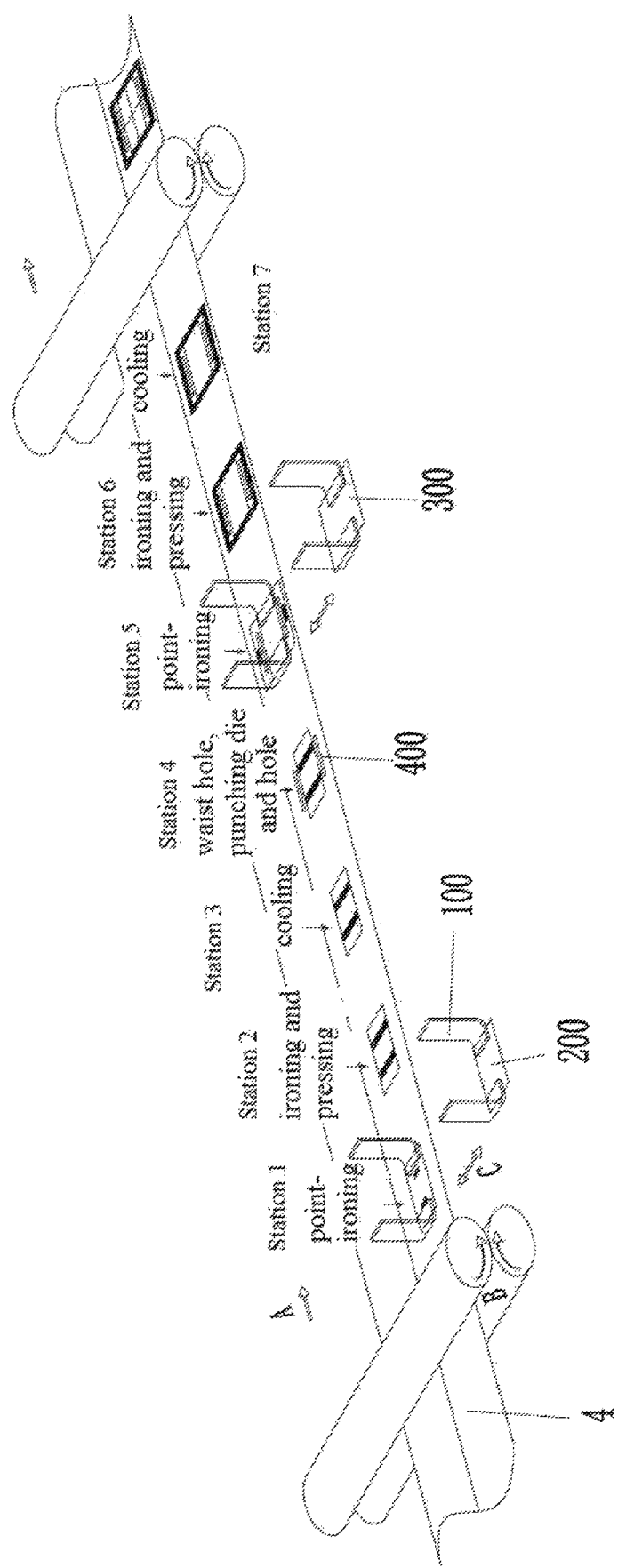
FIG. 3 is a schematic view of a process for making a film material of the packaging bag according to an embodiment of the present invention.

In the present embodiment, clamping devices 33, 331 are provided with clamping jaws 100. The clamping devices control clamping jaws 100 to clamp sealing patch 300 or portable patch 200 and move the sealing patch or portable patch over the film material to conduct follow-up operations. Traction devices 32 include two rollers (as shown in FIG. 3), wherein the rotation directions of the two rollers are opposite (referring to the B position shown in FIG. 3). The film material 4 is located between the two rollers, and the film material is transported by the two rollers rotating in opposite directions.

Referring to FIGS. 2 and 3, the method of manufacturing film material 4 of the present embodiment is that, for example, a layer of portable patch 200, a layer of sealing patch sheet 300, and a pair of punching holes 400 are provided on film material 4 of the accordion packaging bag. The device involved in the technical solution includes operation table 31. Traction devices 32 are respectively mounted on both ends of the surface of operation table 31. First clamping device 33, first point ironing device 34, first ironing and pressing device 35, first cooling device 36, punching device 37, second clamping device 331, second point ironing device 341, second ironing and pressing device 351, second cooling device 361 are respectively mounted between two traction devices 32. In other embodiments, film material 4 can be operated by only one set of clamping, point ironing, ironing and pressing, and cooling devices, and film material 4 can be operated repeatedly in one set of devices to achieve the process of the multilayer patch.

The method of making the film material is described as follows.

Film material 4 is placed in traction devices 32 provided at both ends of operation table 31. After traction devices 32 are started, film material 4 is transported along the feeding direction (direction A shown in FIG. 3) by traction devices 32. In FIG. 3, the station number corresponds to the devices of the equipment one by one. Specifically, station 1 represents the position of first clamping device 33 and first point ironing device 34, station 2 represents the position of first ironing and pressing device 35, station 3 represents the position of first cooling device 36, station 4 represents the position of punching device 37, station 5 represents the position of second clamping device 331 and second point ironing device 341, station 6 represents the position of second ironing and pressing device 351, and station 7 represents the position of second cooling device 361.

When film material 4 comes to a station to be processed (such as the process position where the portable patch, the sealing patch, or punching holes is processed), the transportation of film material 4 is stopped. When the operation is completed by devices, the transportation of film material 4 is started until it reaches the next station, and so on. The devices shown in FIGS. 2 and 3 can conduct an operation to positions to be processed of film material 4 at the same time, and the processed film material 4 can be made into a plurality of packaging bags.

When the processing position of the portable patch on film material 4 is at the position of first clamping device 33, clamping jaws 100 on first clamping device 33 clamp portable patch 200, and portable patch 200 are moved above film material 4.

Next, portable patch 200 is point-ironed by first point ironing device 34, and portable patch 200 is point-ironed to combine with film material 4. Then, portable patch 200 is subject to ironing and pressing by first ironing and pressing device 35 to partially or fully combine portable patch 200 with film material 4 by ironing and pressing. Then, portable patch 200 is cooled by first cooling device 36, and portable patch 200 and film material 4 are cooled into one piece.

After the processing of portable patch 200 of film material 4 is completed, film material 4 is punched by punching device 37 (in the punching step, the portable patch is not touched and only the film material is punched). Alternatively, the structure of the punching hole is long capsule-shaped hole 400. Long capsule-shaped hole 400 is located on at least one side of portable patch 200, preferably, on the two relative sides of portable patch 200 (as shown in FIG. 3).

After the punching step is completed, sealing patch 300 is clamped by second clamping device 331 and sealing patch 300 is moved above film material 4. Sealing patch 300 is point-ironed by second point ironing device 341, and sealing patch 300 and the film material 4 are combined with each other by point-ironing. Sealing patch 300 covers punching hole 400 and has margin. Sealing patch 300 is subject to ironing and pressing by second ironing and pressing device 351, sealing patch 300 is ironed and pressed to combine with film material 4. Ironing and pressing are conducted all around the margin (as shown by the black frame part in station 6 in FIG. 3) of sealing patch 300 covering punching hole 400 to ensure sealing property. Sealing patch 300 is cooled and sealing patch 300 and film material 4 are cooled into one piece.

Till now, the production of the portable portion on the side portion of the accordion packaging bag is completed. It should be noted that, the intuitive surface of the film material of the accordion packaging bag in FIG. 3 is substantially the inner surface of the finished packaging bag, and the opposite surface of the intuitive surface becomes the outer surface of the finished packaging bag. The finished packaging bag can be held by clasping the punching hole on the outer surface and pulling the hollow portion (handle) formed by the punching hole.

In the present embodiment, the portable patch can be provided with a plurality of layers to enhance the strength at the handle. In other embodiments, there is no need to provide a portable patch. The holding can be achieved by using the sealing patch to cover punching hole, and then clasping the hollow portion formed by punching hole.

The method for manufacturing a packaging bag of the present embodiment includes making the above film material into an accordion packaging bag based on the conventional method of manufacturing the accordion packaging bag. The conventional method of manufacturing the accordion packaging bag is prior art, and thus is not further described here.

Figure 4:
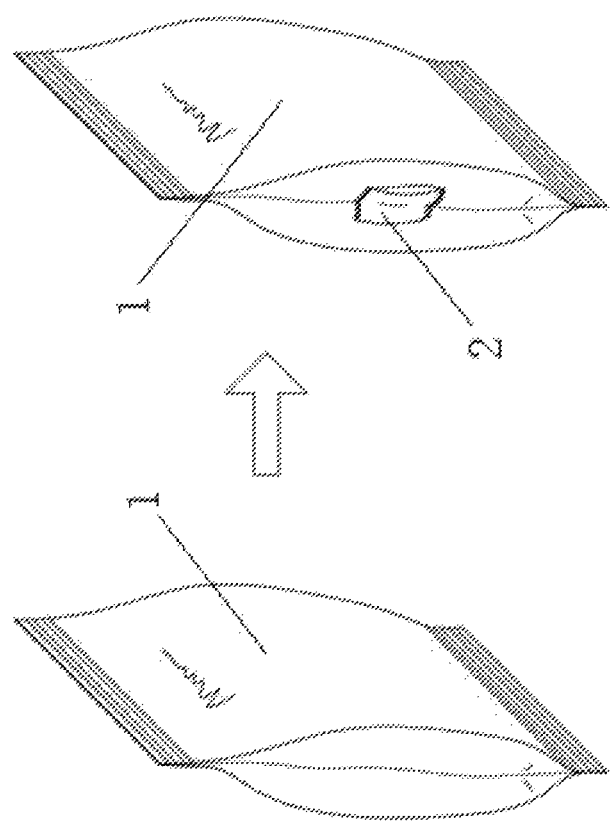
FIG. 4 is a schematic view showing the structural change of a packaging bag according to an embodiment of the present invention.
Figure 5:
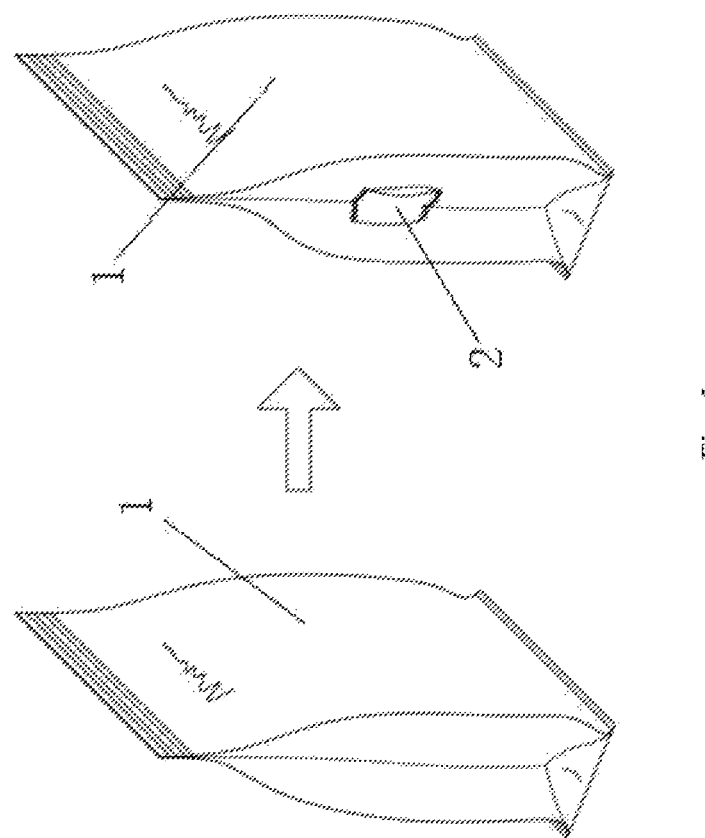
FIG. 5 is a schematic view showing a structural change of a packaging bag according to another embodiment of the present invention.

FIG. 4 and FIG. 5 show two different accordion packaging bag structures. FIG. 4 shows a two-pocket structure accordion packaging bag with an upper pocket and a lower pocket. In FIG. 5, there is an accordion packaging bag only with an upper pocket structure. However, the pocket structures of the accordion packaging bag are not limited to these two pocket structures, other accordion packaging bags having pocket structures at any position are included in the scope of the packaging bag of the present invention.

In view of the above, in the present invention, by adding a portable portion on the side portion of the big sized packaging bag, it is easy to carry or move the packaging bag and the product within the packaging bag that is large in weight, structure, and size. The packaging bag of the present invention has a simple structure, which is convenient to use and process, thereby improving the practicality and usability of the bag.

The above description is only a preferred embodiment of the present invention and is not intended to limit the implementation and scope of the present invention. It should be apparent to those skilled in the art that the solution which obtained by making equivalent substitutions and obvious modifications to the present specification based on specification and drawings of the present invention should fall within the scope of the present invention.

What is claimed is:

1. An apparatus for manufacturing a film material, wherein the film material is used for making a packaging bag having a portable portion, the apparatus comprising:
   a traction device configured for transporting the film material;
   a punching device configured for punching the film material;
   a clamping device configured for clamping a patch;
   a point ironing device configured for point-ironing the patch;
   an ironing and pressing device configured for ironing and pressing the patch; and
   a cooling device configured for cooling the patch,
   wherein the clamping device comprises a first clamping device and a second clamping device; the point ironing device comprises a first point ironing device and a second point ironing device; the ironing and pressing device comprises a first ironing and pressing device and a second ironing and pressing device; the cooling device comprises a first cooling device and a second cooling device, and
   the punching device is located between the first cooling device and the second clamping device.

2. The apparatus for manufacturing the film material of claim 1, wherein the apparatus has two traction devices, the two traction devices are provided at both ends of an operation table; the punching device, the clamping device, the point-ironing device, the ironing and pressing device and the cooling device are mounted on the operation table and located between the two traction devices.

3. The apparatus for manufacturing the film material of claim 1, wherein the first clamping device and the second clamping device are provided with clamping jaws for clamping the patch.

4. The apparatus for manufacturing the film material of claim 1, wherein the traction device comprises two rollers having opposite rotation directions, the film material is located between the two rollers.

5. The apparatus of claim 1, wherein
   the first clamping device and the second clamping device are configured for moving the patch over the film material and attaching the patch to the film material;

the first ironing and pressing device and the second ironing and pressing device are configured for ironing and pressing all around a margin of the patch to ensure sealing property; and the first cooling device and the second cooling device are configured for cooling the patch and the film material into one piece.

\* \* \* \* \*